(12) United States Patent
Evans et al.

(10) Patent No.: US 9,152,651 B2
(45) Date of Patent: Oct. 6, 2015

(54) TICKET ENTRY SYSTEMS AND METHODS

(75) Inventors: Scott A. Evans, Lenexa, KS (US); Robert Lee Marshall, Stilwell, KS (US); Steven Bruce Cudd, Tulsa, OK (US)

(73) Assignee: CELERITASWORKS, LLC, Overland Park, KS (US)

( * ) Notice: Subject to any disclaimer, the term of this patent is extended or adjusted under 35 U.S.C. 154(b) by 681 days.

(21) Appl. No.: 10/965,989

(22) Filed: Oct. 15, 2004

(65) Prior Publication Data

US 2006/0085396 A1    Apr. 20, 2006

(51) Int. Cl.
*G06F 7/00* (2006.01)
*G06F 17/30* (2006.01)

(52) U.S. Cl.
CPC .............................. *G06F 17/30241* (2013.01)

(58) Field of Classification Search
USPC ......................................................... 707/736
See application file for complete search history.

(56) References Cited

U.S. PATENT DOCUMENTS

| | | | |
|---|---|---|---|
| 5,032,989 A * | 7/1991 | Tornetta .............................. | 705/1 |
| 6,343,290 B1 * | 1/2002 | Cossins et al. .................. | 707/10 |
| 6,751,554 B1 | 6/2004 | Asher et al. | |
| 7,773,095 B1 | 8/2010 | Badrak et al. | |
| 2002/0078035 A1 * | 6/2002 | Frank et al. ........................ | 707/3 |
| 2003/0061211 A1 * | 3/2003 | Shultz et al. ...................... | 707/3 |
| 2004/0110515 A1 * | 6/2004 | Blumberg et al. ............ | 701/208 |
| 2004/0243299 A1 * | 12/2004 | Scaer et al. .................... | 701/200 |
| 2008/0270198 A1 | 10/2008 | Graves et al. | |
| 2009/0157418 A1 | 6/2009 | Coleman et al. | |
| 2009/0202112 A1 | 8/2009 | Nielsen et al. | |
| 2009/0204614 A1 | 8/2009 | Nielsen et al. | |
| 2009/0310764 A1 | 12/2009 | Gerhart | |
| 2011/0213631 A1 | 9/2011 | Mislavsky | |
| 2012/0046985 A1 | 2/2012 | Richter et al. | |

OTHER PUBLICATIONS

U.S. Appl. No. 13/463,765, entitled "Notification Delivery System", filed May 3, 2012, invented by S.A. Evans et al., 118 pp.
Office Action 1, mailed May 23, 2014, for U.S. Appl. No. 13/463,765, filed May 3, 2012, 23 pp.

(Continued)

*Primary Examiner* — Debbie Le
(74) *Attorney, Agent, or Firm* — Konrad Raynes Davda & Victor LLP; Janaki K. Davda

(57) ABSTRACT

A ticket entry system and method includes a program management system that receives contact information and a search criteria for a locate request. The program management system transmits the search criteria to a spatial management system that geocodes the search criteria and retrieves map data from a data management system corresponding to the search criteria geocode. The spatial management system transmits the map data to the program management system, which transmits the map data to a user interface. The user interface receives an indication of a site location where the operation is to be performed. The program management system transmits the site location indication to the spatial management system. The spatial management system geocodes the site location indication and transmits the site location geocode to the program management system. The program management system creates a locate ticket, which comprises the site location geocode and the contact information.

58 Claims, 14 Drawing Sheets

(56) References Cited

OTHER PUBLICATIONS

H.L. Smith Letter of Jul. 16, 2012 with attached documents, Total 495 pages. Uploaded as Part A (pp. 1-170), Part B (pp. 171-344), and Part C (pp. 345-495).

H.L. Smith Letter of Aug. 26, 2014, (signed version and unsigned version) Total 4 pp.

B.S. Campbell Affidavit of Aug. 29, 2014, without Exhibit, Total 5 pp.

K. Campbell Cover Letter with B.S. Campbell Affidavit of Aug. 29, 2014, with Exhibit, Total 43 pp.

Kiger Affidavit of Jul. 7, 2014, with Exhibits a, B, C, D, and E, Total 183 pp.

Response to Office Action 1 for U.S. Appl. No. 13/463,765, dated Nov. 21, 2014, 11 pp.

Final Office Action 1 for U.S. Appl. No. 13/463,765, dated Mar. 10, 2015, 26 pp.

* cited by examiner

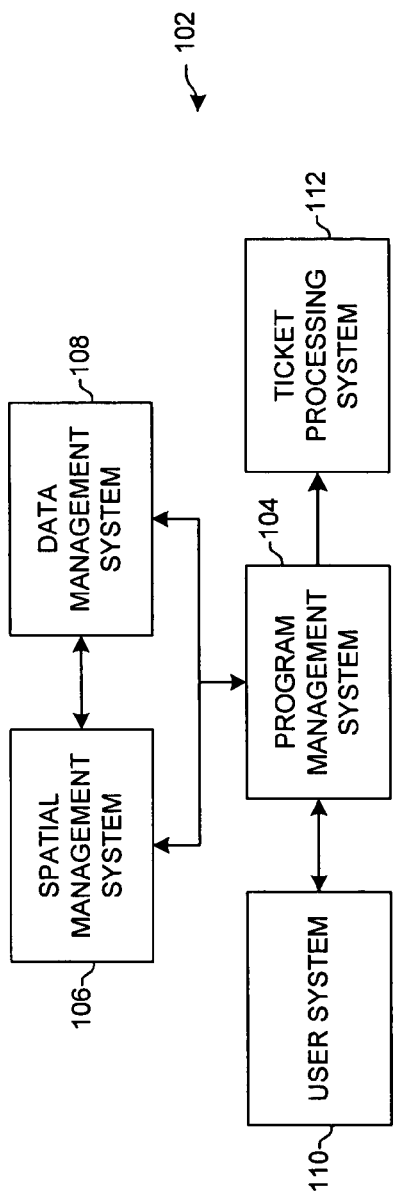
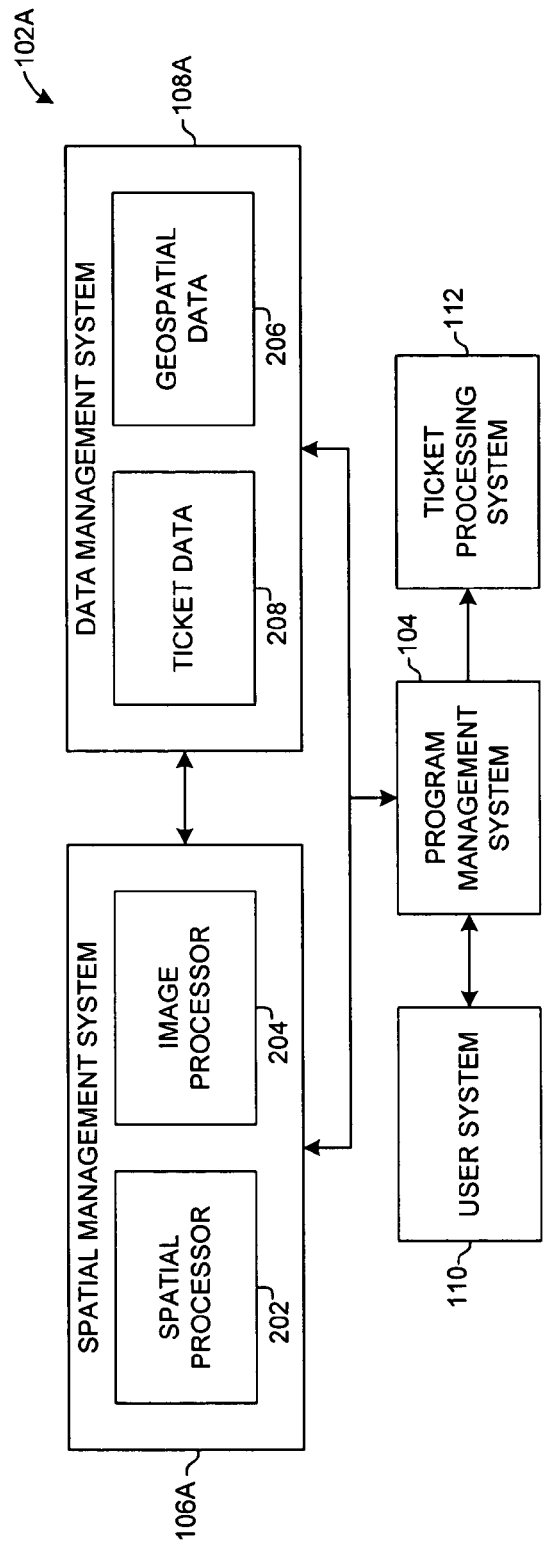

TICKET ENTRY SYSTEMS AND METHODS

RELATED APPLICATIONS

Not Applicable

FEDERALLY SPONSORED RESEARCH OR DEVELOPMENT

Not Applicable

COMPACT DISK APPENDIX

Not Applicable

BACKGROUND OF THE INVENTION

Utility companies, communications companies, governmental entities, and other entities sometimes locate utility and communication pipes and lines and other facilities underground. For example, power lines and gas lines sometimes are located underground. The facilities are often struck by residents, excavators, and other entities during digging, construction, and other operations because the people performing the operation are not aware of the underground facility.

When these facilities are struck, they often are damaged. In addition, people manually performing the operation or using light or heavy equipment often are injured.

Local and state governments and businesses have created call centers that a person or entity about to perform an operation can call to determine if it is safe to perform the operation. For example, if a resident is about to excavate their backyard, the resident may call the call center and tell the customer service person where the resident is about to excavate. The customer service person collects the resident's contact information and a description of the excavation location. Another service person uses the collected information to determine whether or not a facility is buried in the ground or to determine if other hazards exist.

However, the information collected through the call centers often is not accurate or is otherwise flawed. For example, a resident may tell the customer service person that the excavation site is in the backyard close to a fence. Unfortunately, this does not provide the exact location of the excavation, such as if more than one fence exists. It also does not indicate a specific location in any direction from the fence. It does not provide information that would enable a customer service person to more accurately determine whether or not a facility is buried at or near the excavation site.

Improved systems and methods are needed to enable a person or entity to more accurately identify a location for an excavation site or other operation. Improved systems and methods are needed to automate entry of the site location identification and data associated with the operation.

SUMMARY OF THE INVENTION

In one embodiment, a ticket entry system and method include a program management system, a spatial management system, a data management system, and a user interface. The program management system receives contact information and a search criteria for a locate request. The program management system transmits the search criteria to the spatial management system. The spatial management system geocodes the search criteria and retrieves map data from the data management system corresponding to the search criteria geocode. The spatial management system transmits the map data to the program management system.

The program management system transmits the map data to the user system and, in return, receives an indication of a site location where the operation is to be performed. The program management system transmits the site location indication to the spatial management system. The spatial management system geocodes the site location indication and transmits the site location geocode to the program management system. The program management system creates a locate ticket, which comprises the site location geocode and the contact information.

BRIEF DESCRIPTION OF THE DRAWINGS

FIG. 1 is a block diagram of a ticket entry system in accordance with an embodiment of the present invention.

FIG. 2 is a block diagram of another ticket entry system in accordance with an embodiment of the present invention.

FIGS. 4-15 are screen views of a user interface used in connection with a ticket entry system in accordance with an embodiment of the present invention.

DETAILED DESCRIPTION

Figure 3:
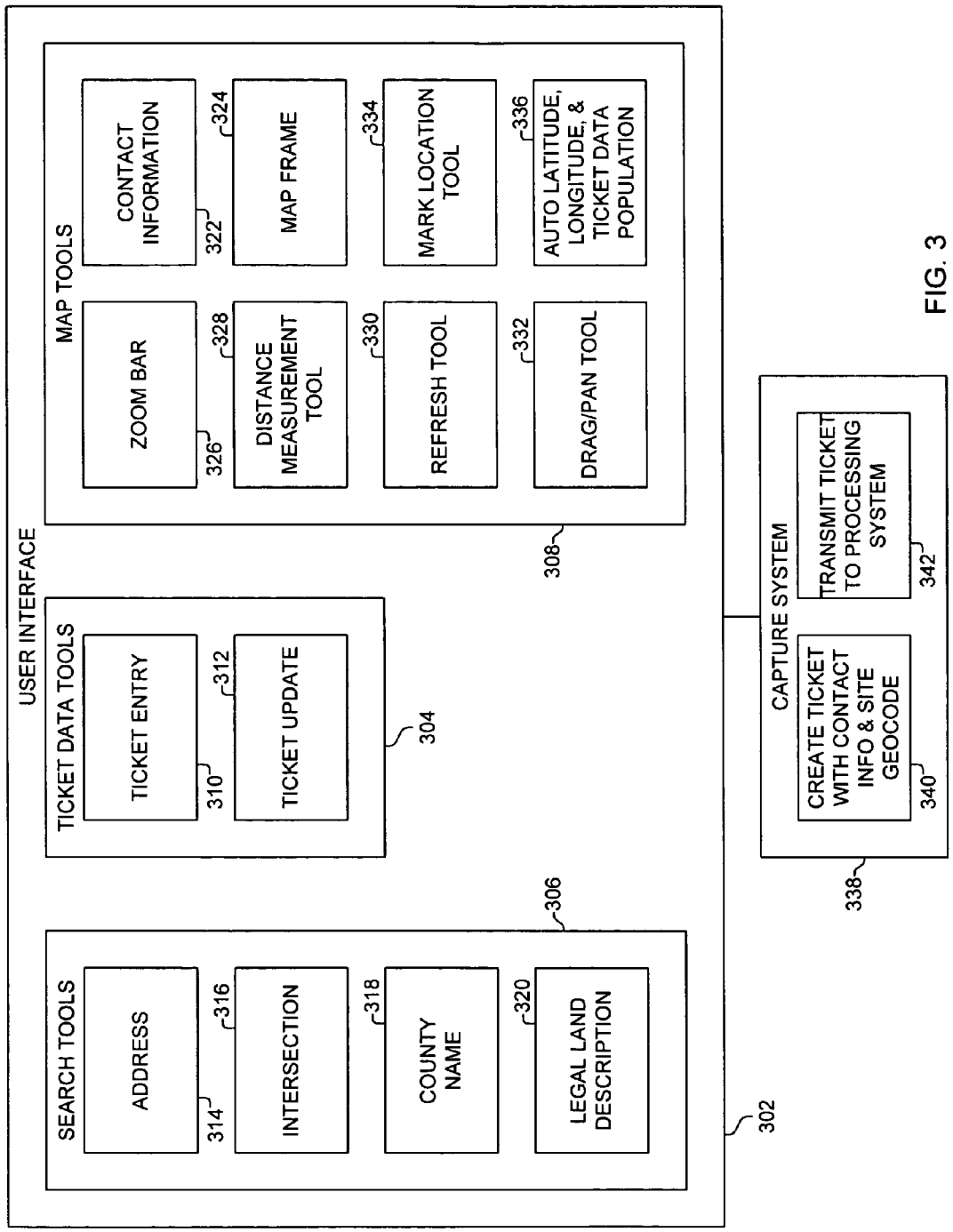
FIG. 3 is a block diagram of a user interface used in connection with a ticket entry system in accordance with an embodiment of the present invention.

The ticket entry (TE) system of the present invention enables a user to enter information when requesting that a location be identified for an operation. Such a request is sometimes referred to as a locate request, and it may be used, for example, by utility and state call centers to determine if the user may perform the operation at the site location, such as to dig at the requested site location.

The TE system of the present invention provides a user with a quick, accurate, and simple way to mark a location of an operation, including an excavation operation, a construction operation, underground boring or other boring, trenching, a facility operation, such as installation, maintenance, or removal of a utility or communication line or pipe, or another operation. The TE system of the present invention may be used for other operations, including determining whether or not the user is complying with regulations, such as regulations requiring a selected distance for construction of a building from a property line and a determination whether or not a permit may be received for a selected operation, such as for excavating or building in a selected geographic location.

In one embodiment, the TE system is used as a dig site locating tool. In this embodiment, a user may enter contact information and a location designation, such as an address, an intersection, a county name, a legal land description, or another location designation. In this embodiment, the legal land description may include a plat designation, a land grid designation, or another legal land description.

Upon entering the contact information and the location designation, the user is presented with map data corresponding to the location designation, such as an aerial image, a parcel map, or other map data. The user is able to visually identify an area for which a dig site or other operation is to be performed and visually mark the location of the dig site or other operation on the map data. The user uses a mouse, a pointer, a touch pad, or another input device to mark the location of the dig site on the map data. The TE system captures the contact information and the dig site location information. In one example, the TE system geocodes the marked dig site location, such as by identifying a latitude and a longitude for the dig site location.

The system eliminates the need for the user to verbally describe to another person where the user wants to dig or perform another operation. It reduces the likelihood that the other person will misconstrue or misunderstand the location or other information being provided by the user. Additionally, it provides the added benefit of automating the location identification and ticket entry for the dig or other operation. Thus, a user may enter the information without making telephone calls, physically walking into a business to enter the ticket, or requiring assistance of another person.

FIG. 1 depicts an exemplary embodiment of a ticket entry (TE) system 102. The TE system 102 may be used, for example, to enter contact information and site location information for an operation.

The TE system 102 of FIG. 1 includes a program management system 104, a spatial management system 106, and a data management system 108. The program management system 104, the spatial management system 106, and the data management system 108 may reside on one processor or processing system together, or they may be split among multiple processors or processing systems. Moreover, each of the program management system 104, the spatial management system 106, and the data management system 108 may reside on a single processor or processing system or use multiple processors or processing systems.

The program management system 104 receives communications from, and transmits communications to the spatial management system 106, the data management system 108, the user system 110, and the ticket processing system 112. The communications may be queries, data, signaling, or other communications. The program management system 104 receives, transmits, and processes geospatial data, contact information and other user data, and ticket data for one or more locate requests.

The program management system 104 communicates with the spatial management system 106 to obtain geospatial data, geocode data, other location data, and/or other ticket, contact, and/or user data associated with the request. Geospatial data comprises geographic data and/or spatial data. Geographic data comprises data identifying a geography, such as a terrain, streets or highways, streams, lakes, other bodies of water, parks, mountains, land marks, structures, and/or other geographic data, including graphic data, image data, text data, and/or other data. Spatial data comprises data of or representing geographic elements or data, including graphic data, image data, text data, and/or other data, and representing a position or location, such as a position or location in space. Spatial data includes location data or position data, such as a latitude, a longitude, an address, a city, a state, a county, streets, street crossings, and/or other data.

A geocode identifies a geographic location of a place or a thing. A geocode may be, for example, a latitude and a longitude of a location. However, other location identifiers may be used to designate a geographic location. Examples of location identifiers are latitude and longitude coordinates, north, south, east, west, up, down, left, right, vertical and horizontal coordinates, North America Data (NAD) 27, NAD 83, axial coordinates, other ordinate systems, positioning indicators, and mark identifiers.

The program management system 104 also communicates with the data management system 108 to store and retrieve data. The stored and retrieved data may include, for example, programming and data required to operate the TE system 102, contact information, user information, geospatial data and other map data, and other data used in the operation of the TE system.

The program management system 104 processes locate requests and other communications from the user system 110. A locate request may include a request to identify a location of a site at or near which an operation is to be performed, contact information, and/or other data. An operation may include, for example, digging, excavation, construction, underground or other boring, trenching, a facility operation, a regulatory compliance determination, and/or a permit determination. The request and other communications between the program management system 104 and the user system 110 may include signaling in which instructions and data are transferred.

The communications between the program management system 104 and the user system 110 may be, for example, queries, data, signaling, and/or other communications. The communications may be requests or responses, such as requests for an identification of a site location, contact information, map data, and/or other data. Other communications may include, for example, static content, such as hypertext markup language (HTML) communications, images, other geospatial data, JavaScript communications, and data identifying styles. Still other communications may include non-static content, such as Java server pages (JSPs), Servlets, flash content, and other content. The signaling may include, for example, instructions to query or transmit data, instructions in response to a query or to transmit data, instructions to obtain access to the program management system 104, instructions to render content, or other instructions.

In some embodiments, the program management system 104 renders one or more images, graphics, text items, and/or other data, such as for a user interface. The program management system 104 communicates with the spatial management system 106 and/or the data management system 108 to obtain the geospatial data, the contact information or other user data, and/or the ticket data. The program management system 104 formats the communications, including the images and/or other data, in a form receivable by the user system 110. In one embodiment, the program management system 104 renders communications, such as images and/or other data, into an HTML communication in a format receivable by the user system 110.

The program management system 104 effects a user interface in one embodiment. The user interface enables the program management system 104 to receive data from the user system 110 and to generate data to the user system. In this embodiment, data is generated for display to the user system 110. The user system 110 also can enter data via the user interface for reception by the program management system 104. In one example, the program management system 104 and the user system 110 communicate via hypertext transfer protocol (HTTP).

The program management system 104 also communicates with the ticket processing system 112. The program management system 104 transmits one or more locate request tickets to the ticket processing system 112. The locate request ticket may be referred to simply as a locate ticket herein.

The locate ticket may include, for example, contact information for the person or entity for which the locate request was submitted, user information if the user information is different from the contact information, and a geocode for the site location of the operation. The locate ticket optionally may include other information, such as a type of operation to be performed at the site location, a date and time the operation is to be performed, an address at or near the site location, the name of the county in which the operation is to be performed, an intersection at or near the operation to be performed, a legal land description on which the operation is to be performed, driving directions to the site location, a property warning or other warning, whether the site location is marked with a sign, paint, chalk, or another marking, whether a directional bore, underground bore, or other bore is to be used in the operation, whether explosives are to be used in the operation, for whom the operation is being done, a grid designation for the operation, a latitude and longitude for related operations, an e-mail address, a facsimile number, or another contact designation, or other ticket information.

The spatial management system 106 receives queries from the program management system 104. If a match is identified for the query, the spatial management system 106 returns a result matching the query to the program management system 104. The result may include map data, such as one or more aerial images, parcel map data, legal land description data, street centerline data, building outline data, raster images, and/or vector images. If a match is not identified, the spatial management system 104 indicates that there is no matching data.

The spatial management system 106 queries the data management system 108 and receives results from the data management system if a match is identified, in some embodiments. The query to the data management system 108 may include a query for map data, ticket data, contact information, and/or other data. If the spatial management system 106 receives data from the data management system 108, the spatial management system may transmit that data to the program management system 104.

The spatial management system 106 geocodes some queries received from the program management system 104. These queries may include, for example, a query to search and/or geocode a location designation, a site location indication, and/or another designation. In one example, the spatial management system 106 receives a query from the program management system 104 requesting a geocode for an address and the map data corresponding to the geocode. The spatial management system 106 geocodes the address, retrieves the map data corresponding to the geocoded address, and transmits the geocode for the address and the map data to the program management system 104. Other examples exist.

The data management system 108 receives and processes communications, such as queries and data, from the program management system 104 and the spatial management system 106. The data management system 108 transmits communications, including map data and other geospatial data, ticket data, and/or contact information and other user data, to the program management system 104 and the spatial management system 106.

The data management system 108 may include one or more data storage systems, databases, data structures, and/or volatile and/or nonvolatile memory. The data management system 108 stores, retrieves, and manages map data and other geospatial data, ticket data, and contact information and other user data.

The user system 110 communicates with the program management system 104 over a connection. The user system 110 transmits one or more locate requests to the program management system 104. The user system 110 receives communications, including data and signaling, and transmits communications, including data and signaling. Transmitted and received data may be entered and/or displayed using a browser or another tool. In one embodiment, the user system 110 includes a browser configured to display data received from the program management system 104, to display data entered by the user system, and to enter data to be transmitted to the program management system. The user system 110 may include one or more processors, one or more storage devices, one or more input devices, including a mouse, a touch pad, or other pointer, and one or more output devices.

In one embodiment, the user system 110 communicates with the program management system 104 via an internet protocol (IP) connection, such as via an intranet or the internet. In other embodiments, another communication link or protocol may be used.

The ticket processing system 112 processes a locate ticket transmitted by the program management system 104. In one embodiment, the ticket processing system 112 is a state or other governmental entity call center, such as a call center used to identify underground facilities, including a utility or communication line, pipe, or other facility. In another embodiment, the ticket processing system 112 is a utility company managing the installation, maintenance, removal, or operation of an in-ground facility, such as a gas pipe, a water conduit, a power line, or another facility. In another embodiment, the ticket processing system 112 is a governmental entity managing regulatory compliance by construction companies for construction and excavation. In another embodiment, the ticket processing system 112 is a community association managing permits being obtained for erecting structures within a specified distance of property lines. Other examples exist.

In one example, the TE system 102 of FIG. 1 operates as follows. The user system 110 connects to the program management system 104. The user system 110 sends a locate request to the program management system 104. The locate request includes a search criteria and contact information identifying the user. In this example, the search criteria identifies an intersection.

The program management system 104 transmits the search criteria to the spatial management system 106. The spatial management system geocodes the search criteria. The spatial management system 106 retrieves the map data corresponding to the geocoded search criteria from the data management system 108. The spatial management system 106 transmits the geocode for the search criteria and the map data to the program management system 104. In other examples, only the map data is transmitted to the program management system 104.

The program management system 104 transmits the map data to the user system 110. The user of the user system 110 marks a site location on the map data. Electronic information identifying the marked site location, which is referred to herein as a site location indication, is transmitted to the program management system 104. The program management system 104 transmits the site location indication to the spatial management system 106. The spatial management system 106 geocodes the site location indication and transmits the site location geocode corresponding to the site location indication to the program management system 104.

The program management system 104 creates a locate ticket and transmits the locate ticket to the ticket processing system 112. In this example, the locate ticket includes the geocode for the site location and contact information for the user.

In another example, the spatial management system 106 also retrieves map data corresponding to the site location geocode and transmits the map data to the program management system 104. In this example, the program management system 104 generates the map data corresponding to the site location geocode to the user system 110 for display.

In still another example, map data corresponding to the site location geocode is not retrieved. However, the program management system 104 generates a communication to the user system 110 that causes a cross or other graphic or image, which is referred to as a selected site locator herein, to be generated on the displayed map data to identify the site location selected by the user. This enables the user to confirm that the selected site location is correct or not correct before the program management system 104 creates the locate ticket.

In another example, the program management system 104 transmits contact information to the data management system 108 for storage. In another example, the program management system 104 does not transmit the contact information to the data management system 108 for storage.

In another example, the program management system 104 transmits other ticket data to the data management system 108 for storage. The program management system 104 may use that data for other locate requests or for other purposes. In one particular example, the program management system 104 identifies a particular user based upon a user identification and password provided by the user to the program management system 104 and saves the user information in the data management system 108.

FIG. 2 depicts another exemplary embodiment of a TE system 102. In the embodiment of FIG. 2, the spatial management system 106A includes a spatial processor 202 and an image processor 204. The data management system 108A includes geospatial data 206 and ticket data 208. Other data may be included in other embodiments.

The spatial processor 202 receives and processes communications, such as queries and data from the program management system 104. The spatial processor 202 transmits communications, such as queries and data to the program management system 104 and the data management system 108A.

In one embodiment, the spatial processor 202 receives geospatial queries and responds with a geocode matching the query and/or other data corresponding to the geocode. If no geocode and/or other data matching the query is identified, the spatial processor 202 indicates that there is no matching data. In one example, when the spatial processor 202 receives a query from the program management system 104, the spatial processor 202 geocodes the query and queries the data management system 108A to obtain the geospatial data corresponding to the geocoded query. The spatial processor 202 receives a response from the data management system 108A with the requested geospatial data and any other requested data and transmits the data to the program management system 104.

The spatial processor 202 identifies and generates one or more geocodes based upon a query, such as a query for a location designation for a site location. The geocodes may include a latitude and longitude or other location identifiers that designate a geographic location for the location designation.

The spatial processor 202 geocodes addresses and other location designations submitted by the user system 110 to the program management system. In one embodiment, the user system 110 transmits an address or another location designation. The program management system 104 receives the location designation and transmits it to the spatial processor 202. The spatial processor 202 geocodes the location designation using the address data. The spatial processor 202 transmits the geocode for the location designation to the program management system 104.

The image processor 204 receives queries from the program management system 104. The image processor 204 transmits a response to the program management system 104 with a match to the query or an indication that the requested data does not exist.

The image processor 204 queries the data management system 108A to obtain map data and/or other geospatial data and ticket data relative to the query. The image processor 204 receives a response with a match to the query or an indication that the requested data does not exist.

The image processor 204 receives requests from the program management system 104 for map data, such as aerial image data, parcel map data, legal land description data, street centerline data, raster image data, and/or vector image data. The image processor 204 responds to the program management system 104 with the corresponding map data or an indication that the requested map data does not exist. The image processor 204 generates map data for geographic areas and/or site location data and/or ticket data.

In one embodiment, the image processor 204 identifies map data located within a selected range of a geocode and generates the map data to the image processor 204 with an identification of the geocode or another identification of the requested location. In one example, the image processor 204 generates one or more aerial images identifying a geographic area within a selected range of a geocoded query and transmits the one or more aerial images to the program management system 104. In another example, the image processor 204 generates one or more parcel maps identifying a geographic area within a selected range of a geocoded site location and transmits the one or more parcel map images to the program management system 602.

In another embodiment, the image processor 204 identifies map data within a selected surrounding area of a geocode and generates map data corresponding to the surrounding area to the program management system 104. In one example, the image processor 204 generates one or more aerial images identifying a geocoded site location and a surrounding area and transmits the one or more aerial images to the program management system 104. In another example, the image processor 204 generates one or more parcel map images identifying a geocoded site location and a surrounding area and transmits the one or more parcel map images to the program management system 602. In other examples, the image processor 204 generates street centerline images, raster images, vector images, and/or legal land description based images corresponding to a selected range of a geocode or a selected surrounding area of a geocode to the program management system 104.

In one embodiment, the queries transmitted from the program management system 104 to the spatial processor 202 and/or the image processor 204 are standard query language (SQL) queries. In this embodiment, the responses transmitted from the spatial processor 202 and/or the image processor 204 to the program management system 104 are SQL responses.

In another embodiment, the queries transmitted from the spatial processor 202 and/or the image processor 204 to the data management system 108A are SQL queries. In this embodiment, the responses transmitted from the data management system 108A to the spatial processor 202 and/or the image processor 204 are SQL responses.

The geospatial data 206 includes map data, other geographic data, other spatial data, and other data for the TE system. The geospatial data 206 also may include geocoded or geocoding data. The map data may include aerial image data, parcel map data, including parcel images, raster image data, vector image data, street and geographic centerline data, and legal land description data. The geospatial data 206 includes images of all of the foregoing.

The ticket data 208 includes one or more of a type of operation to be performed at a site location, an identification of the site location, a work date and time for the operation, an address, a county, an intersection, a legal land description, driving directions to the site location, a property warning or other warning, whether the site location is marked with a sign, paint, chalk, or another marking, whether an underground, directional, or other bore is to be used in the operation, whether explosives are to be used in the operation, for whom the operation is being done, a grid designation for the operation, a latitude and longitude for the site location or other areas corresponding to the search criteria, a contact designation, such as an e-mail address or facsimile number, and/or other ticket data. The ticket data also may include a name, an address, or other contact information for a user of the user system 110 if the user is different from the person or entity for whom the operation is being done. In some instances, the ticket data 208 may include an account number associated with the person or entity for whom the operation is being done or the user and/or a ticket identification (ID). Other data may be included.

In some embodiments, the TE system 102A of FIG. 2 operates as follows. The user system 110 transmits a locate request to the program management system 104. The locate request includes contact information identifying the person for whom the operation is being performed, an excavation as the type of operation, an e-mail address for the contact designation, and an address for the search criteria.

The program management system 104 transmits the address for the search criteria to the spatial processor 202. The spatial processor 202 geocodes the address and transmits the geocode to the program management system 104. In this example, the geocode is a latitude and a longitude corresponding to the address.

The program management system 104 transmits the geocode to the image processor 204 and requests the corresponding map data. The image processor 204 queries the data management system 108A and requests the map data corresponding to the geocode and the map data within a selected surrounding area. The data management system 108A transmits the requested map data to the image processor 204, and the image processor transmits the map data to the program management system 104.

The program management system 104 formats the map data in a format receivable by the user system 110. In this example, the program management system 104 transmits the formatted data in a communication with other signaling to the user system 110 over an IP connection.

The user system 110 receives the communication with the formatted map data and the signaling. In this example, the user system 110 has a browser. The browser processes the signaling and the formatted map data, uses the signaling to generate the map data for display, and generates the map data for display. In this example, the user system 110 also includes a pointer that enables a user of the user system 110 to select a location on the displayed map data. The selected location on the displayed map data is the site location at which the excavation will be performed.

The user system 110 transmits a communication to the program management system 104. The communication includes an indication of the site location and other signaling. The indication for the site location may be data, signaling, or some other indication that identifies at least an approximation of the site location selected by the user on the displayed map data. The site location indication is in a format receivable and processable by the program management system 104. In this example, the site location indication indicates to the program management system 104 the selected site location relative to the map data the program management system previously sent to the user system 110.

The program management system 104 transmits the site location indication to the spatial processor 202. The spatial processor geocodes the site location indication and transmits the site location geocode to the program management system 104.

In one embodiment, the program management system 104 transmits the site location geocode to the image processor 204 and requests the corresponding map data. The image processor 204 queries the data management system 108A to locate the map data corresponding to the site location geocode. The data management system 108A transmits the map data corresponding to the site location geocode to the image processor 204, and the image processor transmits the map data corresponding to the site location geocode to the program management system 104. In another embodiment, the program management system does not retrieve map data corresponding to the site location geocode.

In one embodiment, the program management system 104 transmits a communication to the user system 110. The communication includes a selected site locator, such as an image graphic, an X, a cross, or another image or other data used to display the marked site location on the map data generated for display by the browser. In another embodiment, new map data is transmitted to the user system 110 with the selected site locator as part of the map data. In another embodiment, the selected site locator identifying the marked site location is overlaid on the map data. In still another embodiment, signaling is transmitted with the original map data instructing the browser to locate a selected site locator or other data at or around the site location selected by the user of the user system 110.

The program management system 104 creates a locate ticket. In this example, the locate ticket includes the operation type to be performed, which is an excavation. The locate ticket also includes the geocode for the site location and the contact information for the person or entity for whom the excavation is to be performed. In other examples, other, more, or less ticket data may be included in the locate ticket. For example, the operation type is not included in other examples. Additional ticket data may include one or more of a work date and time, an address, a county name in which the operation is being performed, an intersection at which the operation is being performed, a legal land description for which the operation is being performed, driving directions to the site location, a property warning or other warning, whether the site location is marked, whether a type of bore or explosives are to be used in the operation, a grid designation for the operation, an e-mail address or a facsimile number for the person or entity for whom the operation is being performed, and/or other contact or user information.

In other examples, only the contact information and the geocode for the site location are transmitted in the locate ticket. In still other examples, map data is transmitted with the locate ticket.

In other examples, different types or multiple types of map data are transmitted to the user system 110. In one example, parcel map data and aerial image data both are transmitted in response to a locate request. Other examples exist.

FIG. 3 is an exemplary embodiment of a user interface generated by the program management system 104. The user interface 302 includes one or more search tools 306, one or more ticket data tools 304, and one or map tools 308.

The ticket data tools 304 enable a user to enter, maintain, and/or delete ticket data. In the embodiment of FIG. 3, the ticket data tools 304 include a new ticket entry tool 310 and a ticket update tool 312. Other examples exist.

The search tools 306 enable a user to submit a search criteria to obtain map data for a geographic location. In the embodiment of FIG. 3, the search tools 306 include selections and entries for an address search 314, an intersection search 316, a county name search 318, and a legal land description search 320. Other examples exist.

The map tools 308 are used to display, manipulate, and/or enter map data, contact information, and other ticket data. Contact information entries 322 enable a user to enter contact information, including text data, select entries from dropdown boxes, and select or enter other contact information. The map frame 324 displays the map data and, in some instances, the contact information and/or ticket data. The zoom bar 326 enables a user to zoom in and out of one or views of the map data. The distance measurement tool 328 enables a user to measure the distance from a first location to a second location on the displayed map data. The refresh tool 330 enables a user to regenerate the map data for display. The drag/pan tool 332 enables a user to move the view of the map data in one or more directions, such as left, right, up, down, and diagonally, or north, south, east, west, and interim directions.

The mark location tool 334 enables a user to select a point on the displayed map data to identify the site location of the operation. Once the user selects the site location using the mark location tool 334, the user interface 302 transmits a site location indication to the program management system 104. In one example, the mark location tool 334 is a dig tool used to indicate a site location for digging.

The automatic population function 336 automatically populates a locate request entry form (not shown) with customer information, geocode data, and other ticket data that is known. In one example, when the site location is geocoded, the county name in which the site location is located is automatically retrieved by the program management system 104 either directly from the data management system 108 or via the spatial management system 106.

In one embodiment, the program management system 104 includes a capture system 338 that operates with the user interface 302. After the site location geocode is obtained, the geocode and known customer information and ticket data are populated in the locate request entry form, and the capture system 338 automatically creates the locate ticket 340 with the location site geocode, the contact information, and the known and used ticket data. Additional data may be included. The capture system 338 then transmits the locate ticket 342 to the processing system 112.

FIGS. 4-15 depict an exemplary embodiment of a user interface operating in connection with the TE system 102. The user interface embodied in FIGS. 4-15 depicts an exemplary embodiment of a user interface used to identify a site location at or near which a user will perform digging or some other excavation or boring. The user in this embodiment may be a resident, a business owner, an excavator, or an operator of a facility.

Figure 4:
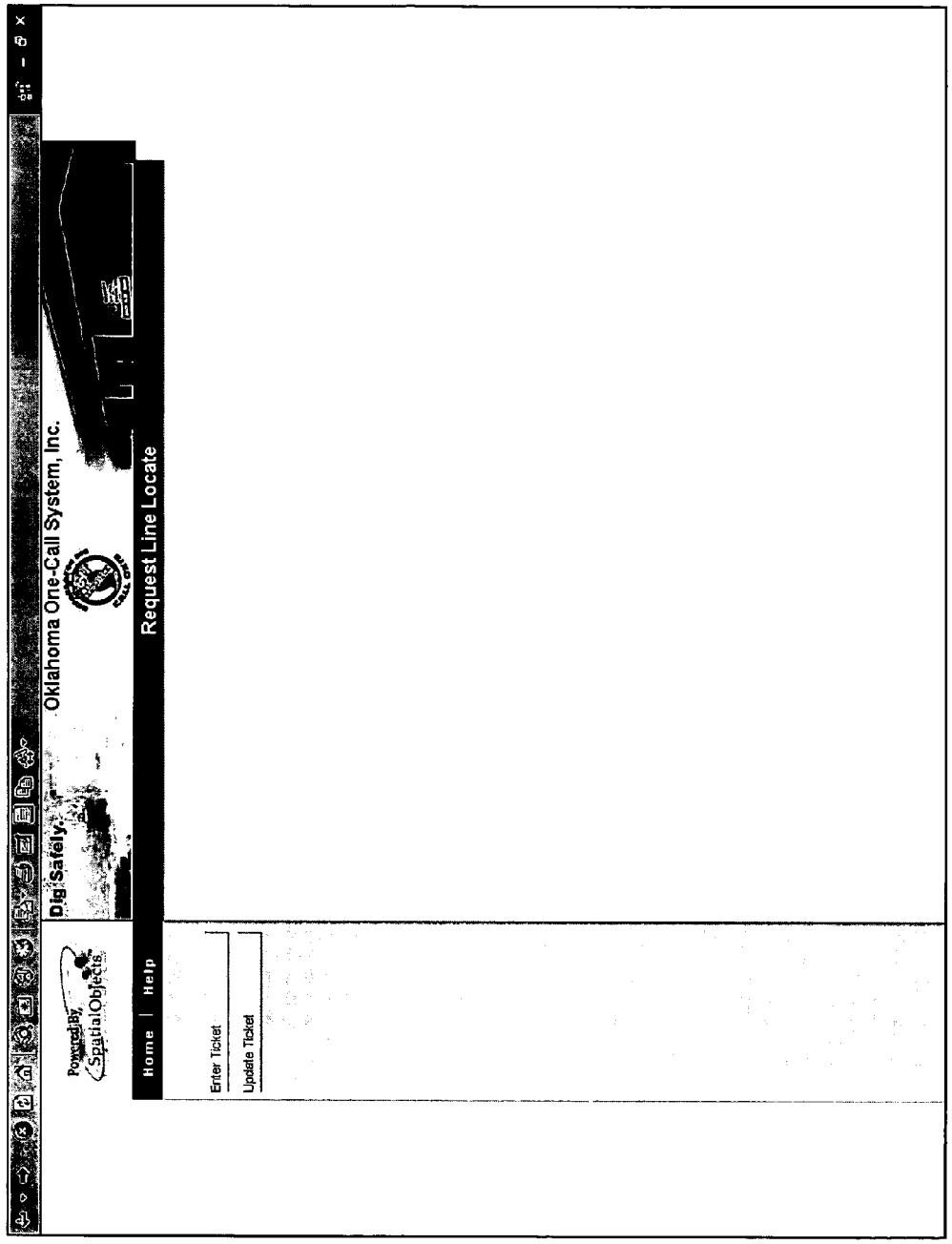

As depicted in FIG. 4, the user logs on to the TE system and is presented with a user interface enabling the user to enter a new ticket or update an existing ticket. In this example, the user selects the enter ticket option.

Figure 5:
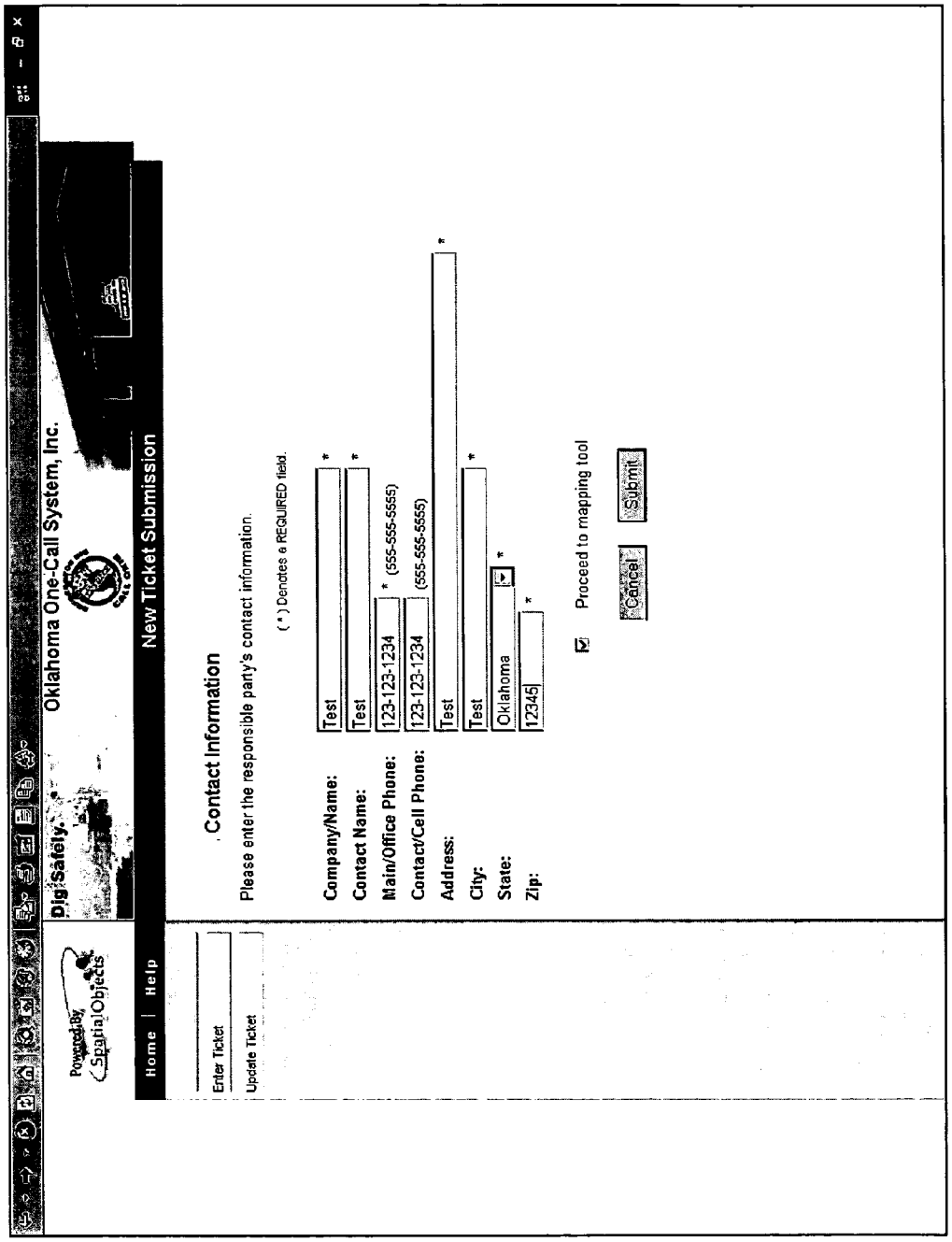

As depicted in FIG. 5, once the user selects the new ticket option, a form is generated for display that enables a user to enter the contact information for the person or entity for whom the operation will be performed. In this example, the form includes contact information for a company or name, a contact name, a main phone number, a cell phone number, an address, a city, a state, and a zip code. Once the user has completed entering the contact information, the user selects the check box labeled "proceed to mapping tool" and selects the submit button.

Figure 6:
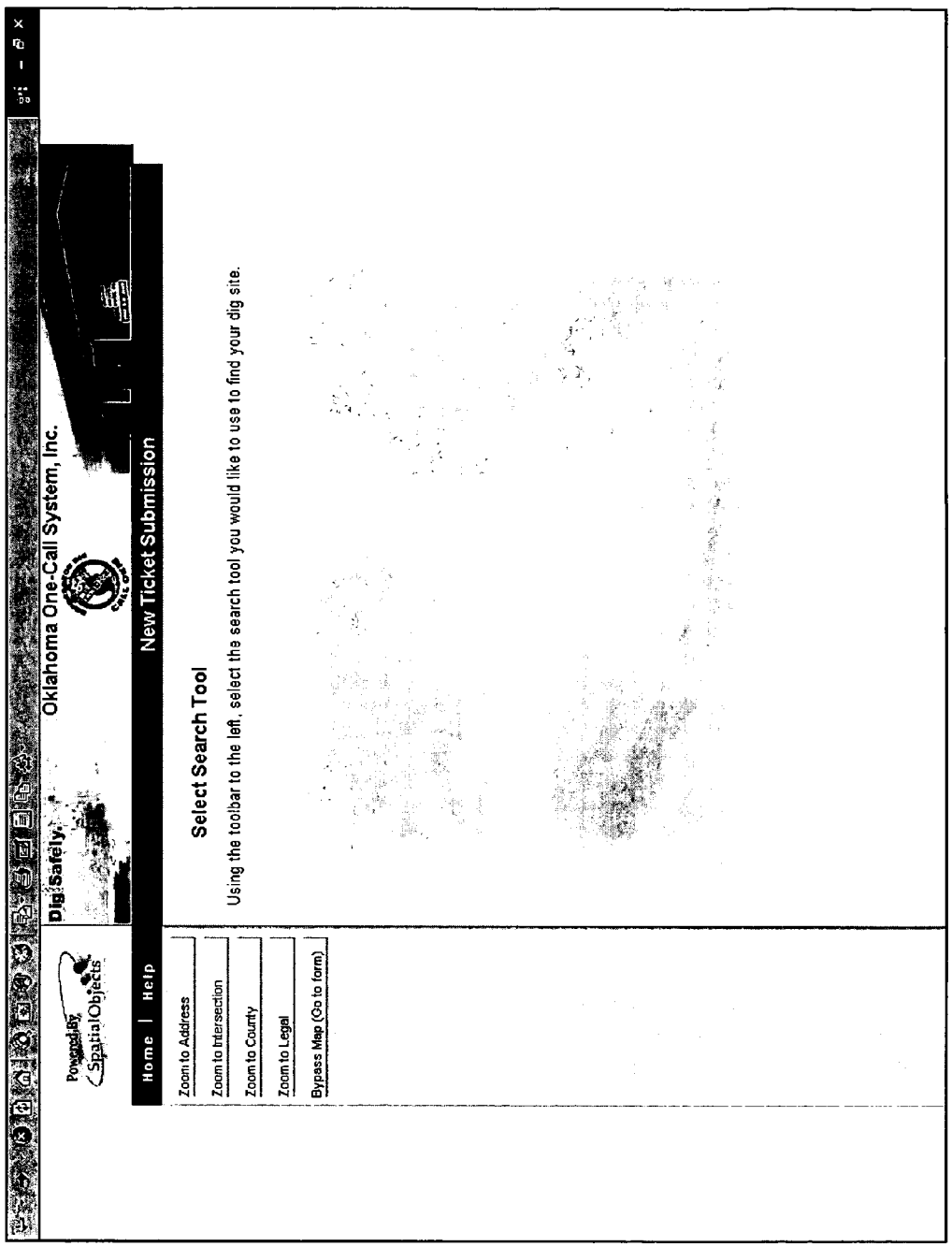

As depicted in FIG. 6, the user next selects the search criteria that will be used to obtain the map data. In the example of FIG. 6, the search criteria includes options for an address search, an intersection search, a county name search, and a legal land description search. Optionally, the user may bypass the map data function and manually enter the ticket data required for the locate ticket in the locate request entry form (see FIG. 12).

Figure 7:
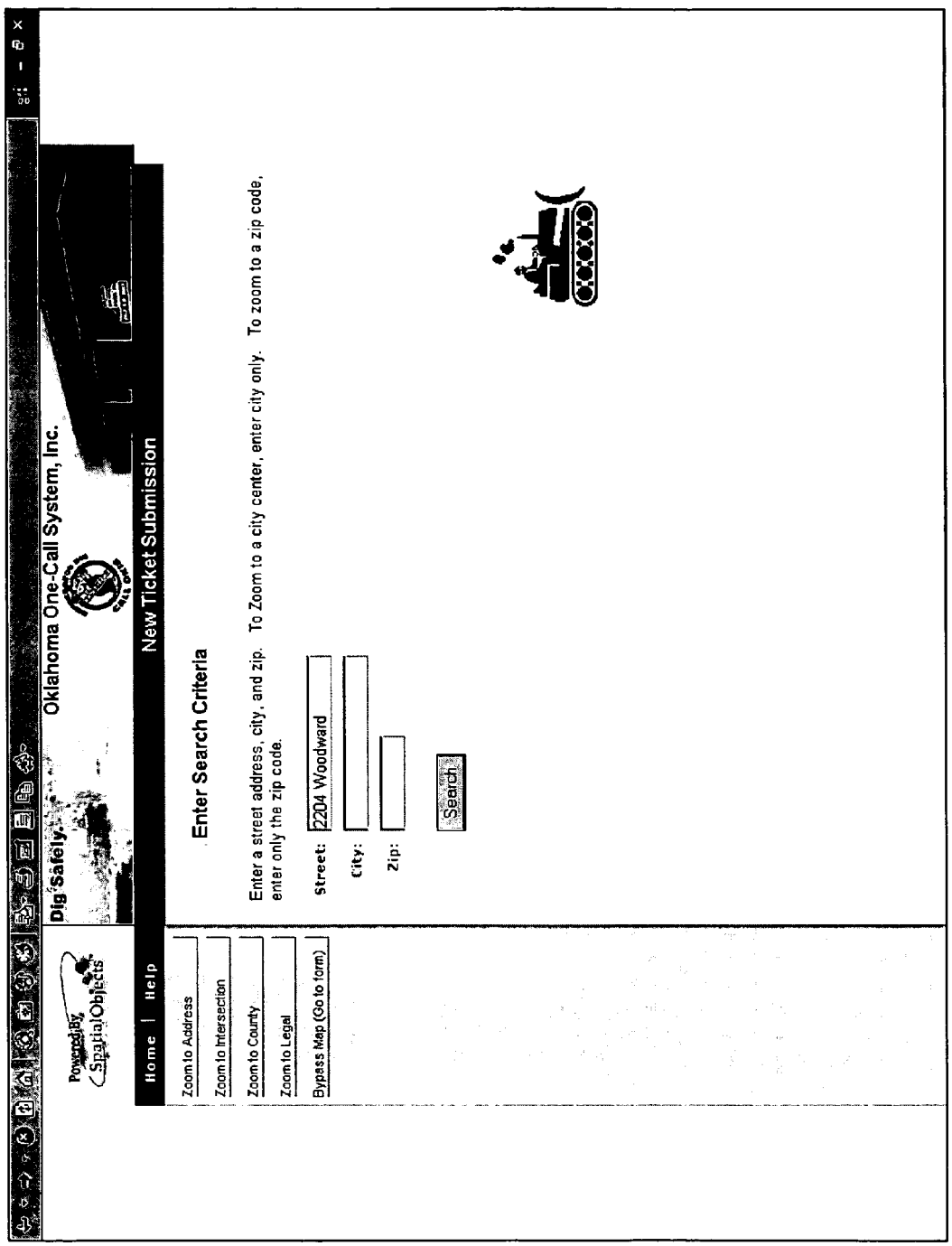
Figure 8:
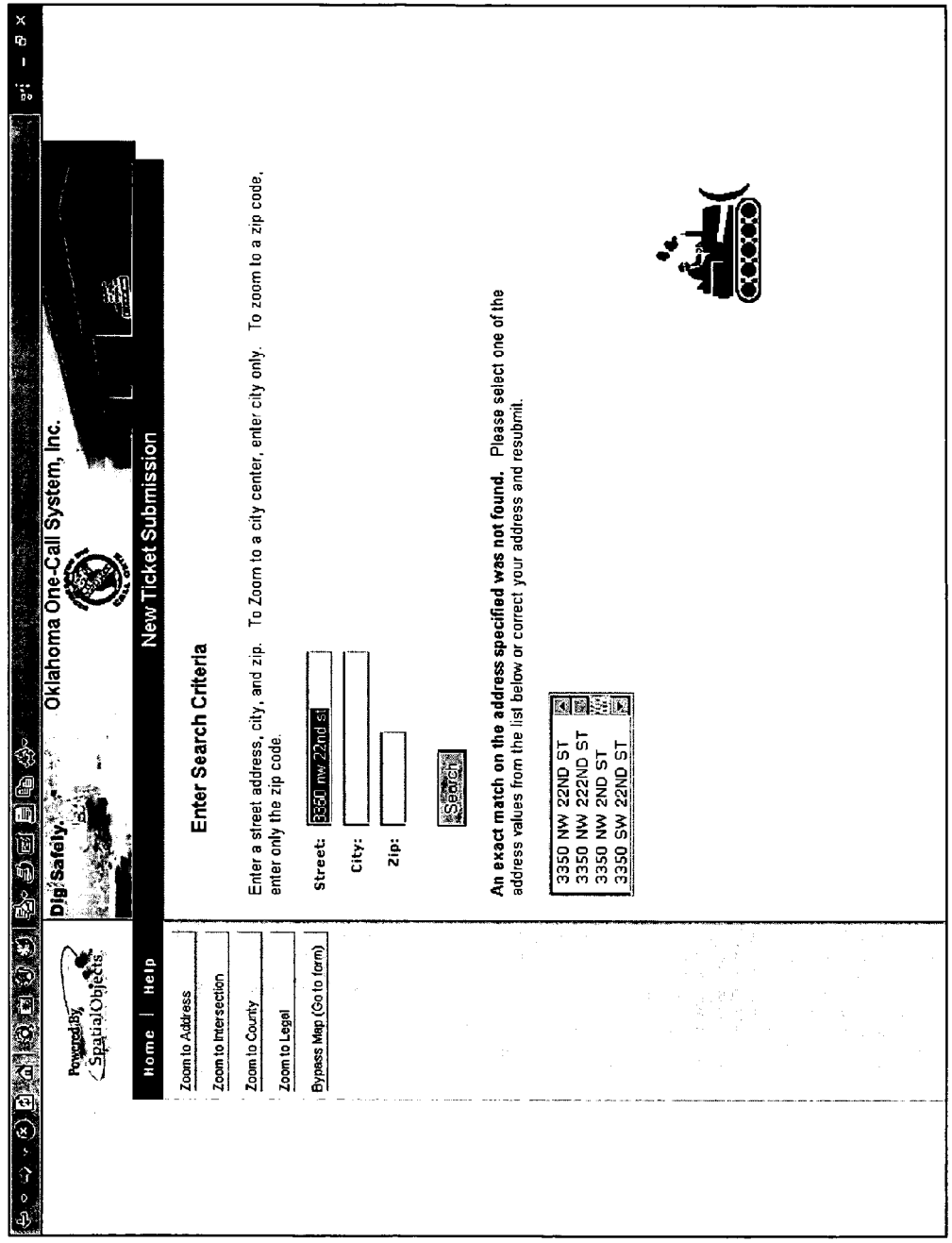

As depicted in FIG. 7, the user selected the address search criteria. In this example, the user enters a street address and name but does not enter a city or zip code. As depicted in FIG. 8, when an exact match is not located for the entered search criteria, the user interface identifies potential matching search criteria data and generates the potential matching search criteria in a selection box. The user selects the correct address and selects the search button.

Figure 9:
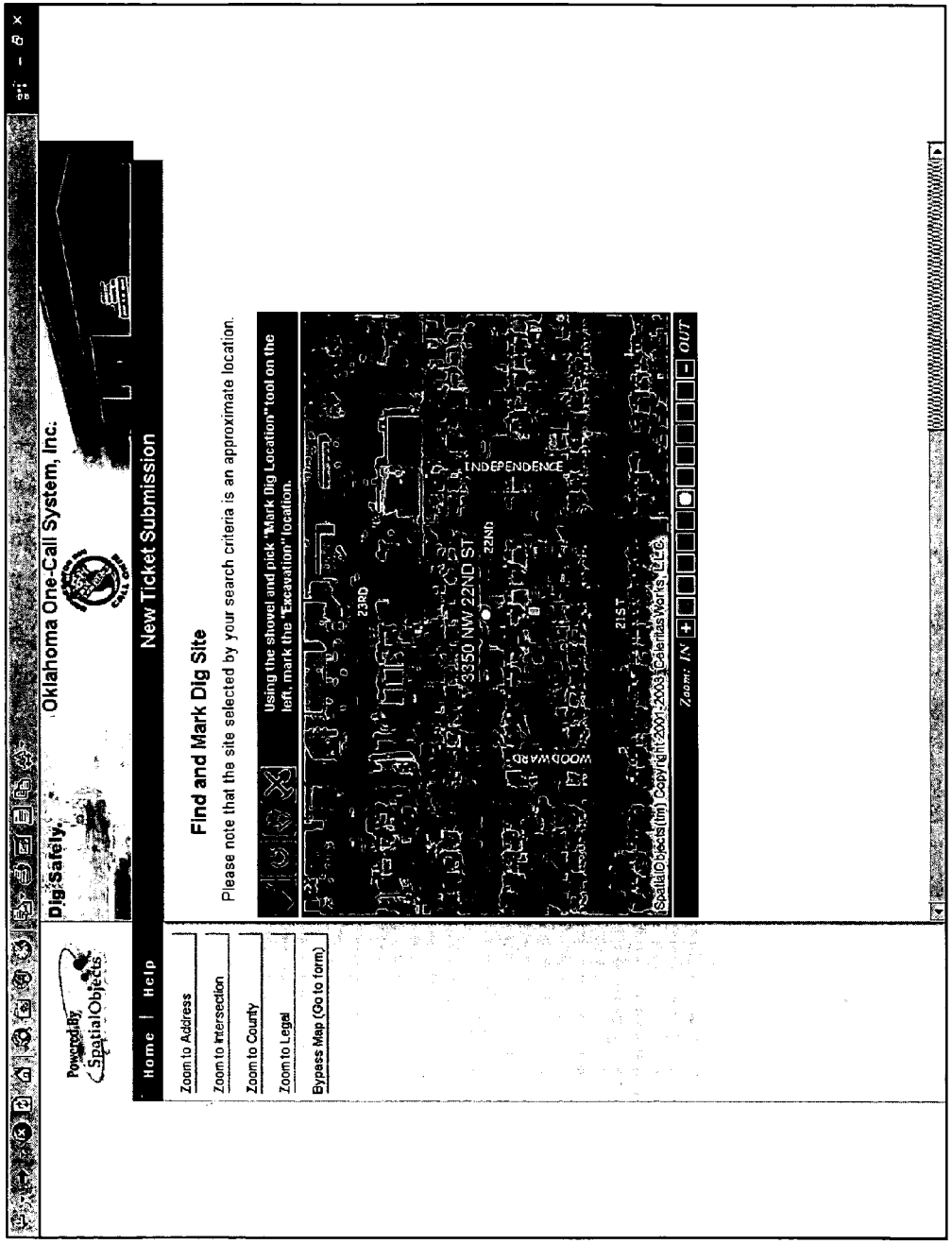

As depicted in FIG. 9, the map data corresponding to the address search criteria, along with a selected surrounding area, are generated for display in a map frame. A selected distance from the search criteria may be generated for display because the search criteria may be only an approximate location.

Figure 10:
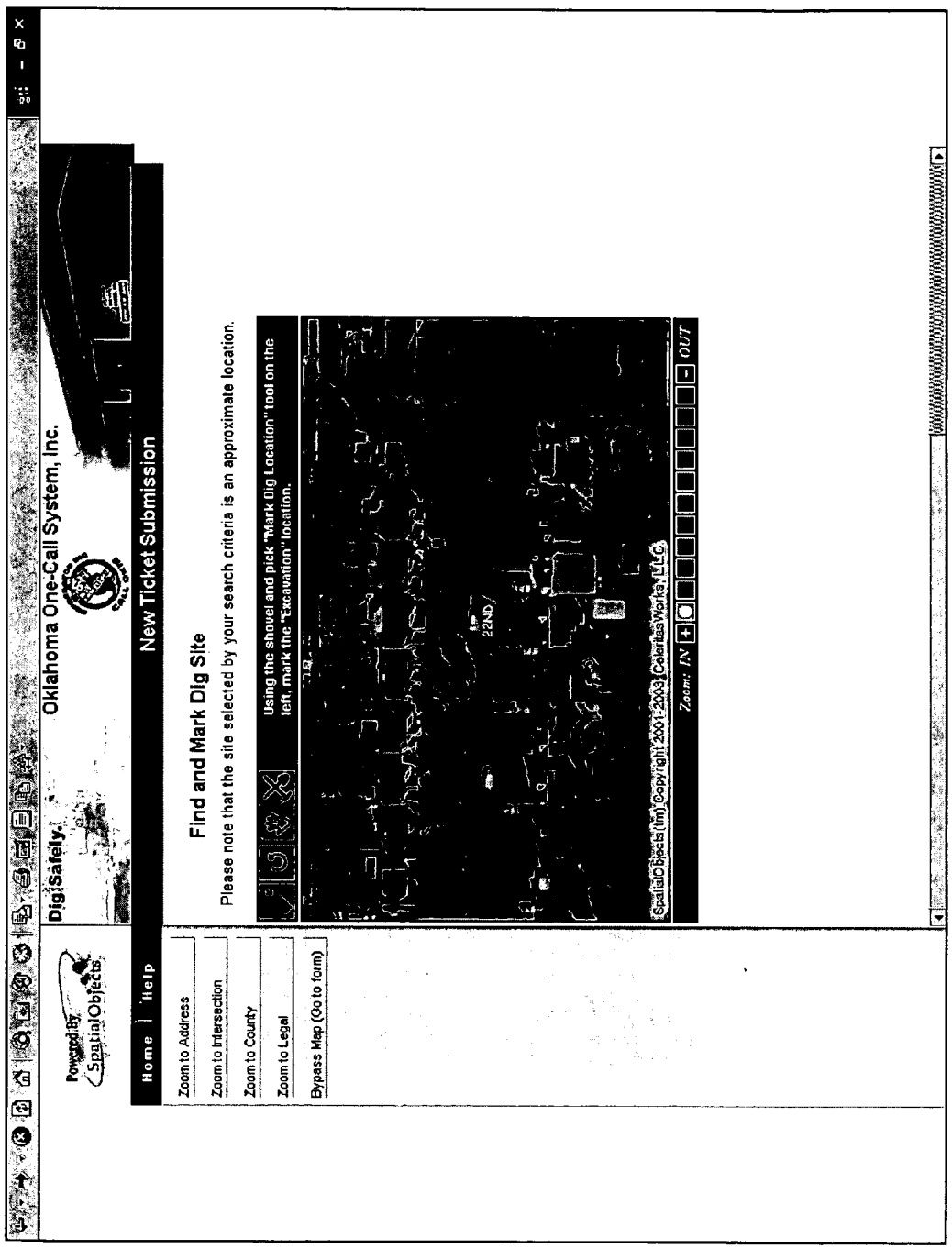

As indicated in FIG. 10, the user zooms closer to the address for the site location. The user selects the dig tool, which is identified by the shovel and pick button, and marks the dig location on the map.

Figure 11:
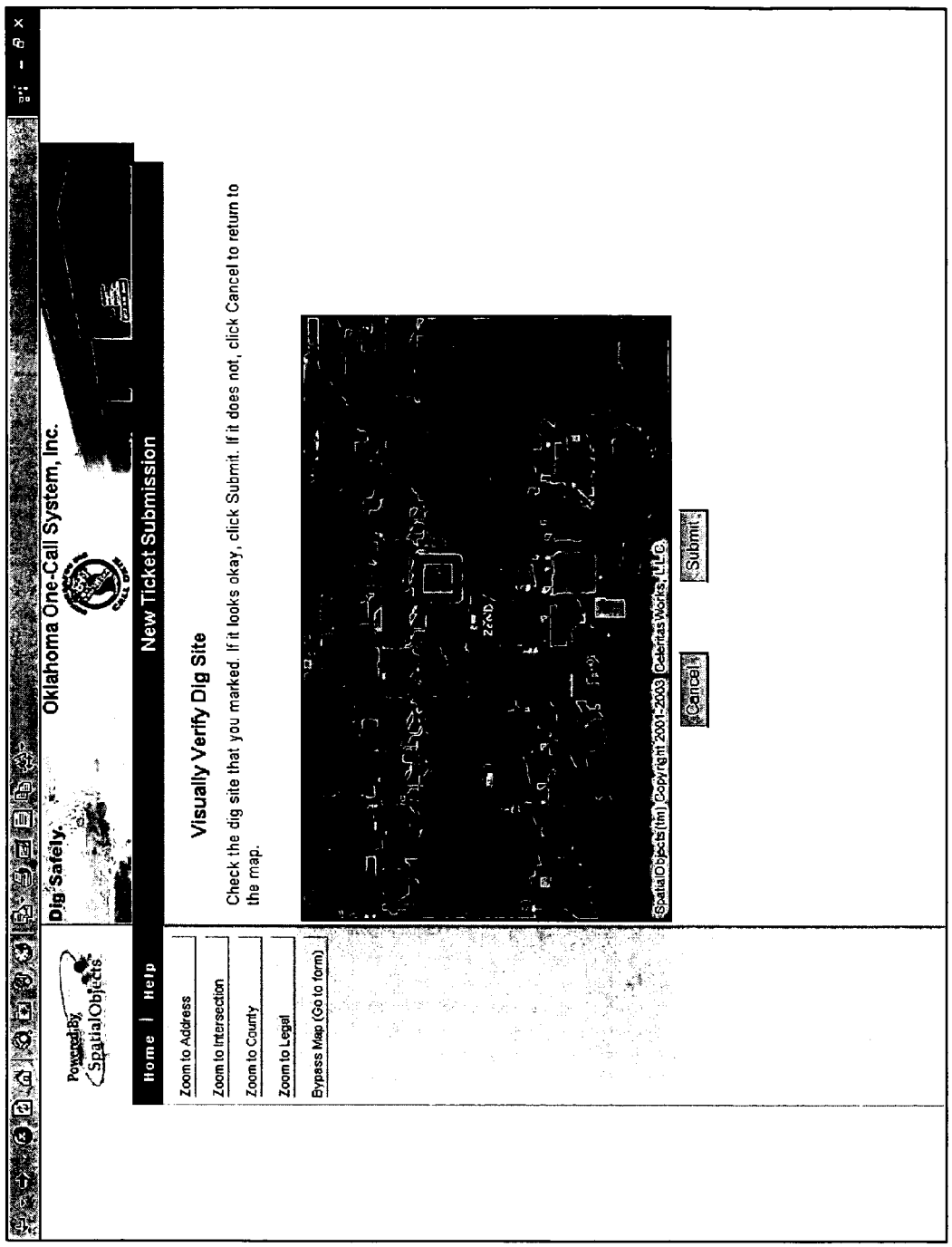

As indicated in FIG. 11, the user interface indicates a cross at the site location marked by the user on the map. In the example of FIG. 11, the user interface also generates a square around the marked site location. If the site location that is marked on the map is correct, the user selects the submit button.

Figure 12:
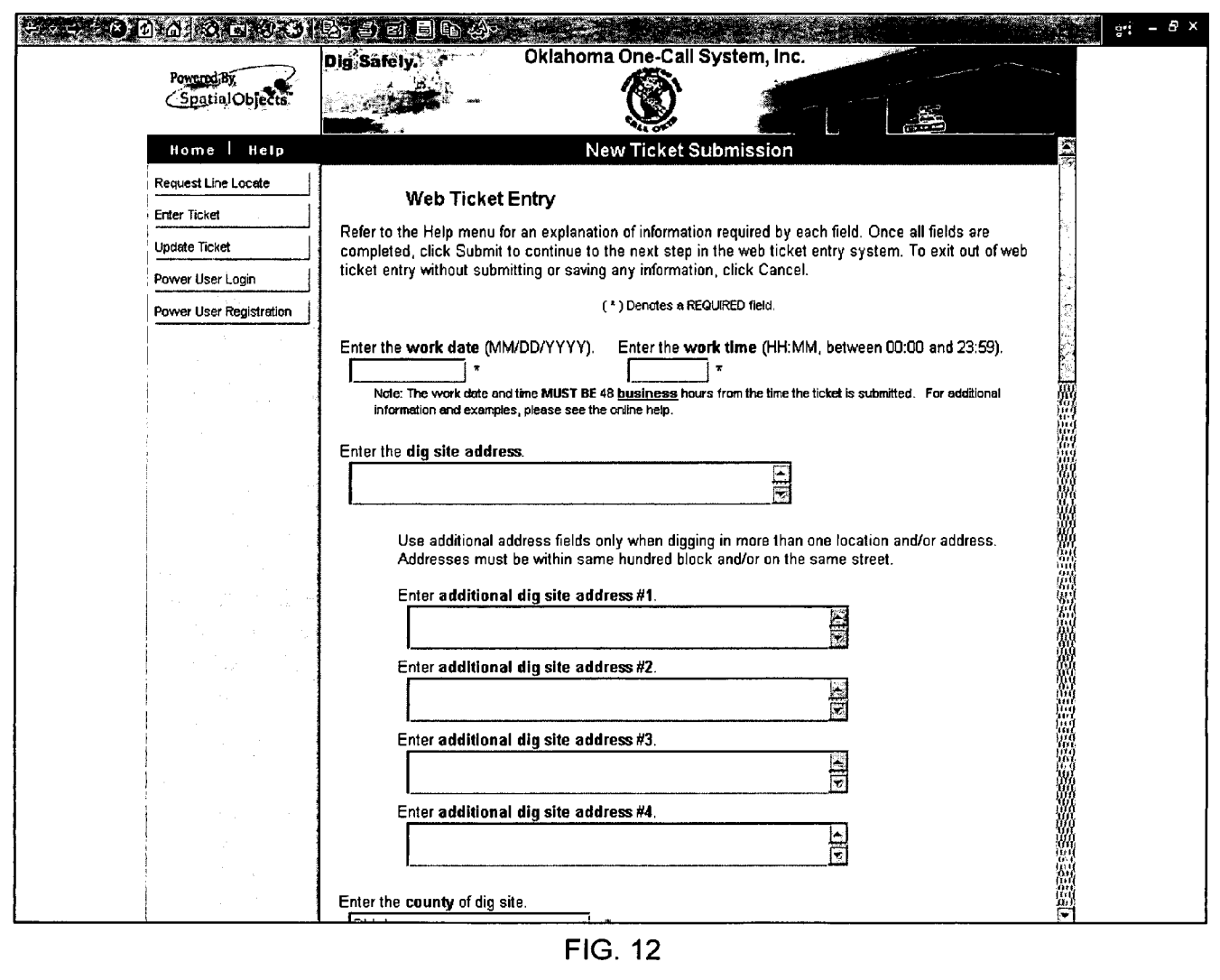
Figure 13:
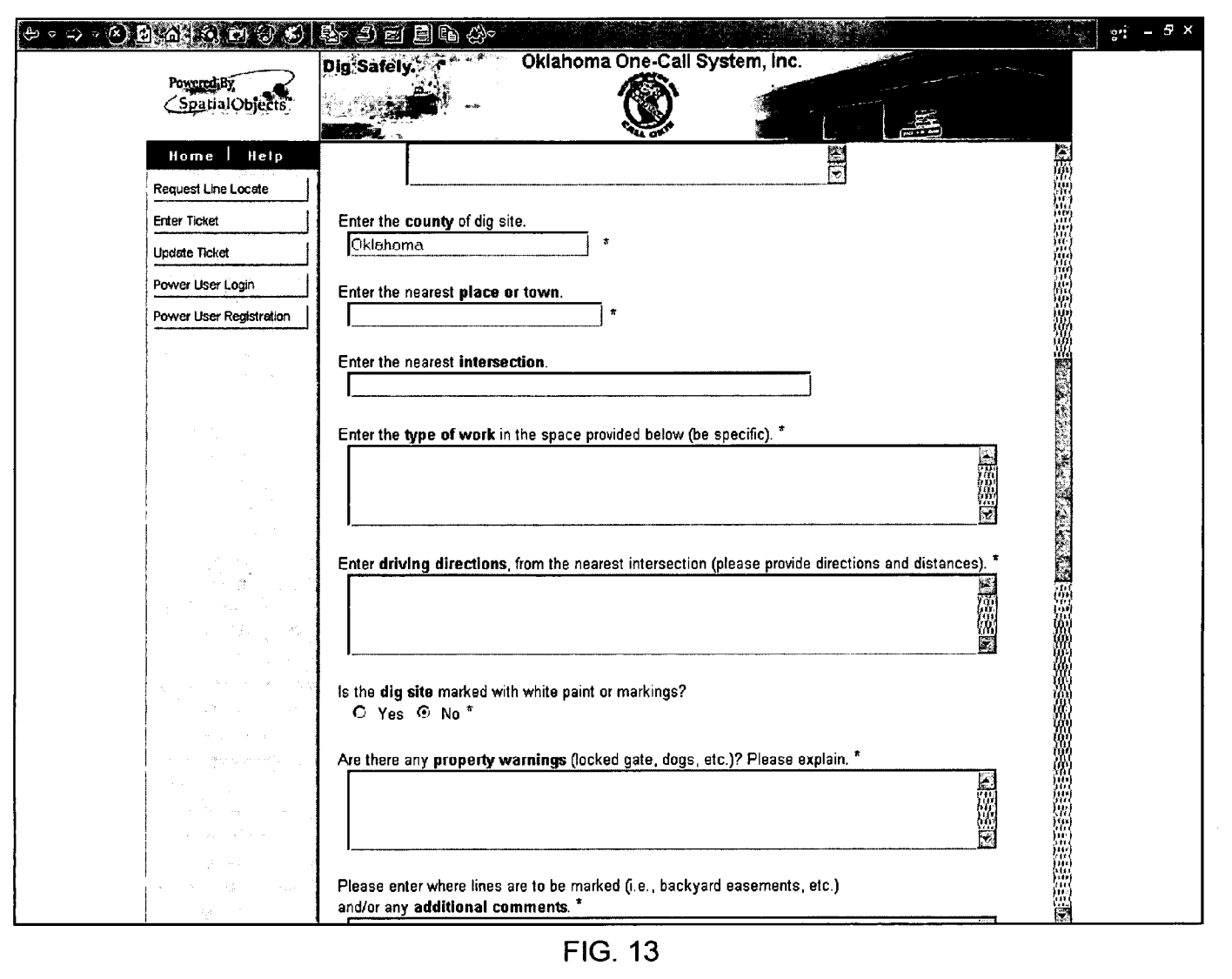
Figure 14:

After the user selects the submit button, the user interface generates a locate request entry form, an example of which is depicted in FIGS. 12-15. In the example of FIG. 12, some ticket data fields are required and others are optional. In the example of FIG. 13, the county name field is automatically populated by the user interface when the user submits the selected dig location. Similarly, as indicated in FIG. 14, the latitude and longitude for the geocoded site location are automatically populated in the locate request entry form.

Figure 15:
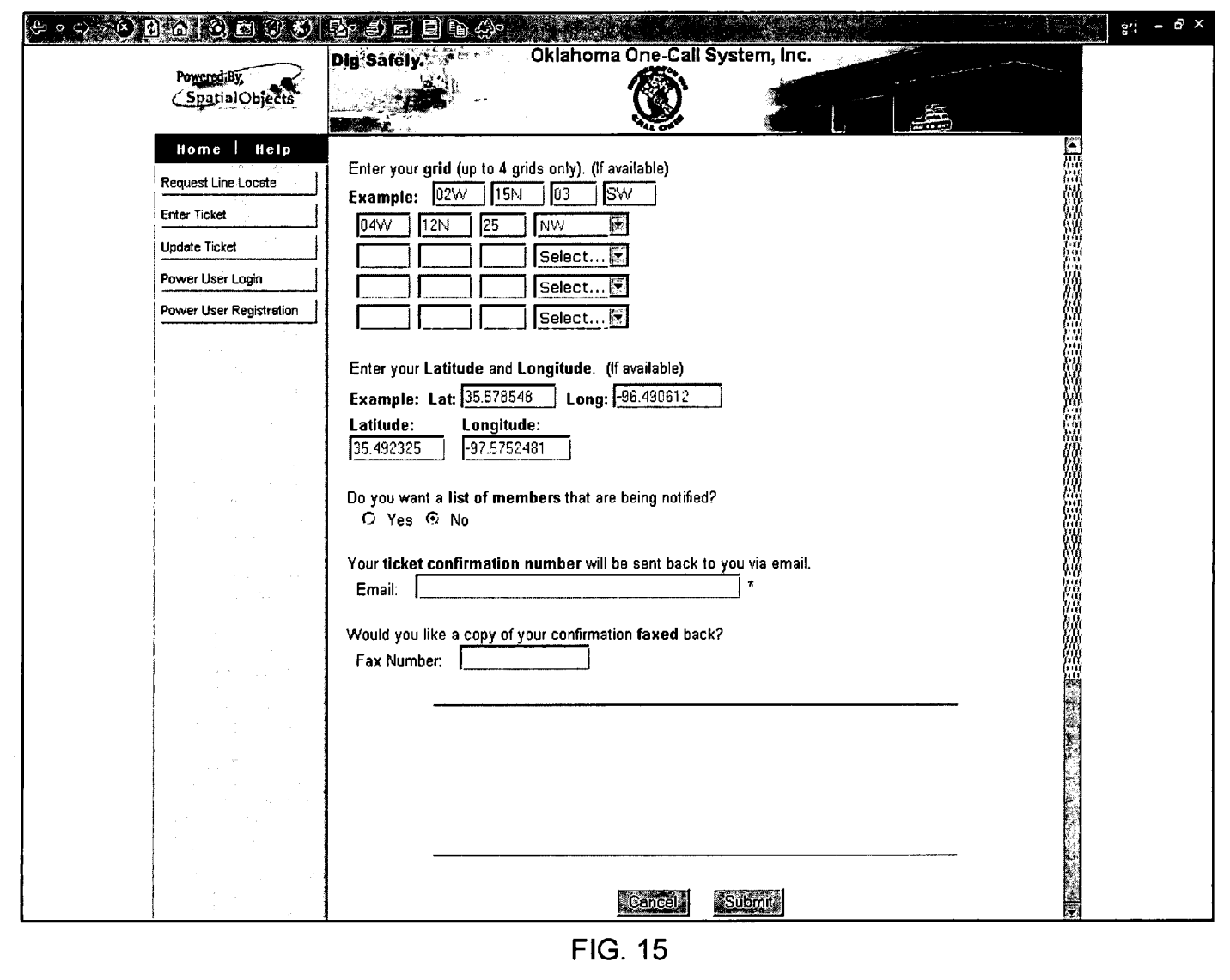

As depicted by FIG. 15, once the user enters the required and optional data in the locate request entry form, the user selects the submit button. The locate ticket is then created. In some embodiments, the created locate ticket then is transmitted to a ticket processing system or another system.

Those skilled in the art will appreciate that variations from the specific embodiments disclosed above are contemplated by the invention. The invention should not be restricted to the above embodiments, but should be measured by the following claims.

What is claimed is:

1. A ticket entry system comprising:
   at least one processor;
   a program management system to execute on the at least one processor and to receive contact information from a user and a location designation from the user comprising search criteria in text form that is used to search for map data for an operation to be performed by a user at a site location, to generate the map data identifying an area corresponding to the location designation, to receive an indication of the site location marked by the user within the area identified by the map data to further identify where the operation is to be performed with a dig tool that represents a type of the operation to be performed, to generate additional map data comprising a selected site locator identifying the site location marked by an X and at least one member of a group consisting of a square, a circle, an oval, and a polygon where the operation is to be performed, to receive a response from the user confirming that the additional map data correctly identifies the selected site locator for generation of a new locate ticket, and, in response to the user confirming that the additional map data correctly identifies the selected site locator, to generate the new locate ticket by automatically entering a geocode for the site location indication and the contact information into a locate request entry form; and a user interface to receive the contact information from the user and the location designation for the operation from the user, to transmit the contact information and the location designation to the program management system, to receive the map data from the program management system, to generate the map data for display, to receive the site location indication marked by the user within the area identified by the map data to further identify where the operation is to be performed, to transmit the site location indication to the program management system, to receive the additional map data from the program management system, to generate the additional map data for display, to receive the response from the user confirming that the additional map data correctly identifies the selected site locator, and to transmit the response to the program management system.

2. The system of claim 1 wherein the operation comprises at least one member of a group consisting of an excavation, a construction, a boring, a trenching, a facility operation, a regulatory compliance determination, and a permit determination.

3. The system of claim 1 wherein the location designation comprises at least one member of a group consisting of an address, an intersection, a county name, and a legal land description.

4. The system of claim 1 wherein the geocode comprises a latitude and a longitude for the site location indication.

5. The system of claim 1 wherein the area corresponding to the location designation comprises a latitude and a longitude for the location designation and a selected surrounding area.

6. The system of claim 1 wherein the area corresponding to the location designation comprises a selected distance from the location designation in at least one direction.

7. The system of claim 1 further comprising a user system configured to transmit the location designation and the contact information for reception by the program management system, to receive the map data generated for display from the user interface, and to generate the site location indication.

8. The system of claim 1 further comprising a ticket processing system configured to process the new locate ticket wherein the program management system further is configured to transmit the new locate ticket for reception by the ticket processing system.

9. The system of claim 1 wherein the program management system further is configured to:
receive additional information for the operation comprising at least one member of a group consisting of a type of the operation, a work date, a work time, an address, a county name, an intersection, a legal land description, driving directions to the site location, a property warning, whether the site location is marked, whether a bore is to be used in the operation, whether explosives are to be used in the operation, for whom the operation is being done, a grid designation for the operation, a latitude and a longitude for another operation, a contact email address, a contact facsimile number, and another contact designation; and generate the new locate ticket with the additional information.

10. The system of claim 1 wherein the map data comprises at least one member of a group consisting of at least one aerial image, at least one parcel map, at least one legal land description map, at least one raster image, at least one vector data, and planimetric data.

11. The system of claim 1 wherein the additional map data comprises at least one member of a group consisting of at least one aerial image, at least one parcel map, at least one legal land description map, at least one raster image, at least one vector data, and planimetric data.

12. The system of claim 1 wherein the site locator designates at least one member of a group consisting of a site location area and a site location point.

13. The system of claim 1 wherein the additional map data comprises at least one member of a group consisting of:
the selected site locator configured to be overlaid on at least a portion of the map data; and
the selected site locator and the at least the portion of the map data identifying the area.

14. The system of claim 1 further comprising a user system configured to receive the map data generated for display by the user interface, to transmit signaling comprising the site location indication, wherein the site location indication represents a selection of the site location on the map data, and to receive the additional map data comprising the selected site locator and generated for display from the user interface, the selected site locator identifying the site location corresponding to the site location indication.

15. The system of claim 1 wherein the site location indication comprises signaling representing a selection of the site location on the map data.

16. The system of claim 1 wherein the site location indication comprises at least one member of a group consisting of a selectable area of the site location and a selectable point of the site location.

17. A method for entering a ticket comprising:
receiving contact information and a location designation comprising search criteria in text form that is used to search for map data for an operation to be performed by a user at a site location at a program management system executing on at least one processor;
generating map data for display from a user interface, the map data identifying an area corresponding to the location designation;
receiving an indication of the site location where the operation is to be performed, the site location indication marked by the user within the area identified by the map data with a dig tool that represents a type of the operation to be performed;
geocoding the site location indication at a spatial management system using the at least one processor or at least one other processor;
generating additional map data for display from the user interface, the additional map data comprising a selected site locator identifying the site location marked by an X and at least one member of a group consisting of a square, a circle, an oval, and a polygon where the operation is to be performed;

receiving a response from the user confirming that the additional map data correctly identifies the selected site locator for generation of a new locate ticket; and in response to the user confirming that the additional map data correctly identifies the selected site locator, generating the new locate ticket at the program management system by automatically entering a geocode for the site location indication and the contact information into a locate request entry form.

18. The method of claim 17 further comprising transmitting the new locate ticket from the program management system for reception by a ticket processing system.

19. The method of claim 17 wherein receiving the location designation for the operation comprises receiving the location designation for at least one member of a group consisting of an excavation, a construction, a boring, a trenching, a facility operation, a regulatory compliance determination, and a permit determination.

20. The method of claim 17 wherein receiving the location designation comprises receiving at least one member of a group consisting of an address, an intersection, a county name, and a legal land description.

21. The method of claim 17 wherein generating the geocode comprises generating a latitude and a longitude for the site location indication.

22. The method of claim 17 wherein generating the map data identifying the area corresponding to the location designation comprises generating the map data for a latitude and a longitude for the location designation and a selected surrounding area.

23. The method of claim 17 wherein generating the map data identifying the area corresponding to the location designation comprises generating the map data for a selected distance from the location designation in at least one direction.

24. The method of claim 17 further comprising:
transmitting the location designation and the contact information from a user system for reception by the program management system;
receiving the map data at the user system; and
generating the site location indication from the user system for reception by the program management system.

25. The method of claim 17 further comprising:
transmitting the new locate ticket from the program management system for reception by a ticket processing system; and
processing the new locate ticket with the ticket processing system.

26. The method of claim 17 further comprising:
receiving additional information for the operation comprising at least one member of a group consisting of a type of operation, a work date, a work time, an address, a county name, an intersection, a legal land description, driving directions to the site location, a property warning, whether the site location is marked, whether a bore is to be used in the operation, whether explosives are to be used in the operation, for whom the operation is being done, a grid designation, a latitude and a longitude for another operation, an email address, a facsimile number, and another contact designation; and
generating the new locate ticket with the additional information.

27. The method of claim 17 wherein generating the map data for display comprises generating for display at least one member of a group consisting of at least one aerial image, at least one parcel map, at least one legal land description map, at least one raster image, at least one vector data, and planimetric data.

28. The method of claim 17 wherein generating the map data for display comprises generating for display at least one member of a group consisting of at least one aerial image, at least one parcel map, at least one legal land description map, at least one raster image, at least one vector data, and planimetric data.

29. The method of claim 17 wherein generating the additional map data for display comprises generating for display the selected site locator designating at least one member of a group consisting of a site location area and a site location point.

30. The method of claim 17 wherein generating the additional map data for display comprises generating for display at least one member of a group consisting of:
the selected site locator configured to be overlaid on at least a portion of the map; and
the selected site locator and the at least the portion of the map data identifying the area.

31. The method of claim 17 further comprising:
receiving the map data at a user system;
transmitting signaling comprising the site location indication from the user system for reception by the program management system, wherein the site location indication represents a selection of the site location on the map data; and
receiving at the user system the additional map data comprising the selected site locator, the selected site locator identifying the site location corresponding to the site location indication.

32. The method of claim 17 wherein receiving the site location indication comprises receiving signaling representing a selection of the site location on the map data.

33. The method of claim 17 wherein receiving the site location indication comprises receiving at least one member of a group consisting of a selectable area of the site location and a selectable point of the site location.

34. The method of claim 17 further comprising retrieving the map data from a data management system and transmitting the map data to the spatial management system.

35. A method for entering a ticket comprising:
receiving contact information and a location designation comprising search criteria in text form that is used to search for map data for an operation to be performed by a user at a site location at a program management system executing on at least one processor;
generating map data for display from a user interface, the map data identifying an area corresponding to the location designation;
at the program management system, receiving an indication of the site location marked by the user within the area identified by the map data with a dig tool that represents a type of the operation to be performed to further identify where the operation is to be performed;
geocoding the site location indication using the at least one processor or at least one other processor;
generating additional map data for display from the user interface, the additional map data comprising a selected site locator identifying the site location marked by an X and at least one member of a group consisting of a square, a circle, an oval, and a polygon where the operation is to be performed;
receiving a response from the user confirming that the additional map data correctly identifies the selected site locator for generation of a new locate ticket; and
in response to the user confirming that the additional map data correctly identifies the selected site locator, generating the new locate ticket comprising the site location indication geocode and the contact information.

36. The method of claim 35 further comprising transmitting the new locate ticket for reception by a ticket processing system.

37. The method of claim 35 wherein receiving the location designation comprises receiving the location designation for at least one member of a group consisting of an excavation, a construction, a boring, a trenching, a facility operation, a regulatory compliance determination, and a permit determination.

38. The method of claim 35 wherein receiving the location designation comprises receiving at least one member of a group consisting of an address, an intersection, a county name, and a legal land description.

39. The method of claim 35 wherein generating the site location indication geocode comprises generating a latitude and a longitude for the site location indication.

40. The method of claim 35 wherein generating the map data identifying the area corresponding to the location designation comprises generating the map data for a latitude and a longitude for the location designation and a selected surrounding area.

41. The method of claim 35 wherein generating the map data identifying the area corresponding to the location designation comprises generating the map data for a selected distance from the location designation in at least one direction.

42. The method of claim 35 further comprising:
transmitting the contact information and the location designation from a user system for reception by a program management system;
receiving the map data at the user system generated for display from the program management system; and
generating the site location indication from the user system for reception by the program management system.

43. The method of claim 35 further comprising:
transmitting the new locate ticket for reception by a ticket processing system; and processing the new locate ticket with the ticket processing system.

44. The method of claim 35 further comprising:
receiving additional information for the operation comprising at least one member of a group consisting of a type of operation, a work date, a work time, an address, a county name, an intersection, a legal land description, driving directions to the site location, a property warning, whether the site location is marked, whether a bore is to be used in the operation, whether explosives are to be used in the operation, for whom the operation is being done, a grid designation, a latitude and a longitude for another operation, an email address, a facsimile number, and another contact designation; and
generating the new locate ticket with the additional information.

45. The method of claim 35 wherein generating the map data for display comprises generating for display at least one member of a group consisting of at least one aerial image, at least one parcel map, at least one legal land description map, at least one raster image, at least one vector data, and planimetric data.

46. The method of claim 35 further comprising retrieving the additional map data from a data management system.

47. The method of claim 35 wherein generating the additional map data for display comprises generating for display at least one member of a group consisting of at least one aerial image, at least one parcel map, at least one legal land description map, at least one raster image, at least one vector data, and planimetric data.

48. The method of claim 35 wherein generating the additional map data for display comprises generating for display the selected site locator designating at least one member of a group consisting of a site location area and a site location point.

49. The method of claim 35 wherein generating the additional map data for display comprises generating for display at least one member of a group consisting of:
the selected site locator configured to be overlaid on at least a portion of the map data of the identifying the area; and
the selected site locator and the at least the portion of the map data identifying the area.

50. The method of claim 35 further comprising:
receiving the map data at a user system from a program management system;
transmitting signaling comprising the site location indication, wherein the site location indication represents a selection of the site location on the map data; and
receiving the additional map data comprising the selected site locator at the user system.

51. The method of claim 35 wherein receiving the site location indication comprises receiving signaling representing a selection of the location on the map data.

52. The method of claim 35 wherein receiving the site location indication comprises receiving at least one member of a group consisting of a selectable area of the site location and a selectable point of the site location.

53. A ticket entry system comprising:
at least one processor;
a program management system to execute on the at least one processor and to receive a location designation comprising search criteria in text form that is used to search for map data for an operation to be performed by a user at a site location from a user, to generate the map data identifying an area corresponding to the location designation, to receive an indication of the site location marked by the user within the area identified by the map data to further identify where the operation is to be performed with a dig tool that represents a type of the operation to be performed, to generate additional map data comprising a selected site locator identifying the site location marked by an X and at least one member of a group consisting of a square, a circle, an oval, and a polygon to further identify where the operation is to be performed, to receive a response from the user confirming that the additional map data correctly identifies the selected site locator for generation of a new locate ticket, and, in response to the user confirming that the additional map data correctly identifies the selected site locator, to generate the new locate ticket comprising a geocode for the site location indication, the operation comprising at least one member of a group consisting of an excavation, a construction, a boring, a trenching, and a ground facility operation;
a spatial management system to execute on the at least one processor and to receive the location designation from the program management system, to retrieve the map data identifying the area corresponding to the location designation, to transmit the map data to the program management system, to receive the site location indication from the program management system, to geocode the site location indication, to transmit the geocode to the program management system, to retrieve the additional map data, and to transmit the other map data to the program management system, the other map data comprising the selected site locator identifying the site location marked by the user where the operation is to be performed;
a data management system to execute on the at least one processor and to store the map data and the other map data and to transmit the map data and the additional map data to the spatial management system; and
a user interface to receive the map data from the program management system, to generate the map data for display, to receive the site location indication marked by the user within the area identified by the map data to further identify where the operation is to be performed, to transmit the site location indication to the program management system, to receive the other map data from the program management system, and to generate the other map data for display.

54. A method for entering a ticket comprising:
receiving a location designation comprising search criteria in text form that is used to search for map data for an operation to be performed by a user at a site location at a program management system executing on at least one processor, the operation comprising at least one member of a group consisting of an excavation, a construction, a boring, and a trenching;
generating the map data identifying an area corresponding to the location designation for display;
receiving, at the program management system, an indication of the site location marked by the user within the area identified by the map data to further identify where the operation is to be performed, wherein the site location is marked with a dig tool that represents a type of the operation to be performed;
geocoding the site location indication;
generating other map data identifying a selected site locator at the site location marked by an X and at least one member of a group consisting of a square, a circle, an oval, and a polygon where the operation is to be performed; and
in response to the user confirming that the additional map data correctly identifies the selected site locator for generation of a new locate ticket, generating the new locate ticket at the program management system, the new locate ticket comprising the geocode.

55. A method for entering a ticket comprising:
receiving a location designation comprising search criteria in text form that is used to search for map data for an operation to be performed by a user at a site location, the operation comprising at least one member of a group consisting of an excavation, a construction, a boring, and a trenching;
generating for display the map data identifying an area corresponding to the location designation;
receiving, at the at least one processor, an indication of the site location marked by the user within the area identified by the map data to further identify where the operation is to be performed with a dig tool that represents a type of the operation to be performed;
geocoding the site location indication;
generating additional map data identifying a selected site locator at the site location marked by an X and at least one member of a group consisting of a square, a circle, an oval, and a polygon where the operation is to be performed; and
in response to the user confirming that the additional map data correctly identifies the selected site locator for generation of a new locate ticket, generating the new locate ticket by automatically entering a geocode for the site location indication and the contact information into a locate request entry form.

56. A ticket entry system comprising:
at least one processor;
a program management system to execute on the at least one processor and to receive contact information from a user and a location designation from the user comprising search criteria in text form that is used to search for map data for an operation to be performed, to generate the map data identifying an area corresponding to the location designation, to receive an indication of the site location marked by the user within the area identified by the map data to further identify where the operation is to be performed with a dig tool that represents a type of the operation to be performed, to generate a communication causing display of a selected site locator at the site location marked by an X and at least one member of a group consisting of a square, a circle, an oval, and a polygon within the area identified by the map data to further identify where the operation is to be performed, and to generate a new locate ticket by automatically entering a geocode for the site location indication and the contact information into a locate request entry form;
a spatial management system to execute on the at least one processor and to receive the location designation from the program management system, to retrieve the map data identifying the area corresponding to the location designation, to transmit the map data to the program management system, to receive the site location indication from the program management system, to geocode the site location indication, and to transmit the geocode to the program management system;
a data management system to execute on the at least one processor and to store the map data and to transmit the map data to the spatial management system; and
a user interface to receive the contact information from the user and the location designation from the user for the operation, to transmit the contact information and the location designation to the program management system, to receive the map data from the program management system, to generate the map data for display, to receive the site location indication marked by the user within the area identified by the map data to further identify where the operation is to be performed, to transmit the site location indication to the program management system.

57. A method for entering a ticket comprising:
receiving contact information and a location designation comprising search criteria in text form that is used to search for map data for an operation to be performed by a user at a site location at a program management system executing on at least one processor;
generating the map data for display from a user interface, the map data identifying an area corresponding to the location designation;
receiving an indication of the site location where the operation is to be performed, the site location indication marked by the user within the area identified by the map data with a dig tool that represents a type of the operation to be performed;
geocoding the site location indication at a spatial management system using the at least one processor;
generating a communication from the program management system causing display of a selected site locator at the site location marked by an X and at least one member of a group consisting of a square, a circle, an oval, and a polygon within the area identified by the map data to further identify where the operation is to be performed; and generating a new locate ticket at the program management system by automatically entering a geocode for the site location indication and the contact information into a locate request entry form.

58. An entry system comprising:

at least one processor;

a program management system to execute on the at least one processor to receive a location designation from a user comprising search criteria in text form that is used to search for map data for an operation to be performed by a user at a site location, to generate the map data identifying an area corresponding to the location designation, to receive an indication of the site location marked by the user within the area identified by the map data to further identify where the operation is to be performed, wherein the site location is marked with a dig tool that represents a type of the operation to be performed, and to generate additional map data comprising a selected site locator identifying the site location marked by an X and at least one member of a group consisting of a square, a circle, an oval, and a polygon where the operation is to be performed;

a spatial management system to execute on the at least one processor to receive the location designation from the program management system, to retrieve the map data identifying the area corresponding to the location designation, and to transmit the map data to the program management system;

a data management system to execute on the at least one processor to store the map data and to transmit the map data to the spatial management system; and a user interface to receive the location designation for the operation from the user, to transmit the location designation to the program management system, to receive the map data from the program management system, to generate the map data for display, to receive the site location indication marked by the user within the area identified by the map data where the operation is to be performed, and to transmit the site location indication to the program management system.

* * * * *